US009529733B1

United States Patent
Sokolov et al.

(10) Patent No.: US 9,529,733 B1
(45) Date of Patent: Dec. 27, 2016

(54) SYSTEMS AND METHODS FOR SECURELY ACCESSING ENCRYPTED DATA STORES

(71) Applicant: Symantec Corporation, Mountain View, CA (US)

(72) Inventors: Ilya Sokolov, Boston, MA (US); Brian Powell, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 147 days.

(21) Appl. No.: 14/490,026

(22) Filed: Sep. 18, 2014

(51) Int. Cl.
*G06F 21/31* (2013.01)
*G06F 12/14* (2006.01)
*H04L 9/08* (2006.01)

(52) U.S. Cl.
CPC ........... *G06F 12/1408* (2013.01); *G06F 21/31* (2013.01); *H04L 9/0825* (2013.01)

(58) Field of Classification Search
None
See application file for complete search history.

(56) References Cited

U.S. PATENT DOCUMENTS

| | | | | |
|---|---|---|---|---|
| 6,615,212 B1 * | 9/2003 | Dutta | ................ | G06F 17/30569 |
| 7,170,999 B1 * | 1/2007 | Kessler | ................ | G06F 21/606 |
| | | | | 380/201 |
| 7,877,598 B2 * | 1/2011 | Schmidt | .............. | H04L 63/0428 |
| | | | | 709/232 |
| 8,782,281 B2 * | 7/2014 | Mail | ..................... | H04L 51/066 |
| | | | | 709/246 |
| 9,031,229 B1 * | 5/2015 | Nita | ........................ | H04L 9/008 |
| | | | | 380/28 |
| 9,055,016 B2 * | 6/2015 | McNamara | ........ | G06Q 30/0241 |
| 9,258,122 B1 * | 2/2016 | Zhang | ........................ | H04L 9/14 |
| 2002/0087549 A1 * | 7/2002 | Mostafa | ................ | H04L 12/587 |
| 2002/0102998 A1 * | 8/2002 | Lin | ..................... | H04M 1/7253 |
| | | | | 455/466 |
| 2003/0097564 A1 * | 5/2003 | Tewari | .................... | H04L 12/14 |
| | | | | 713/171 |

(Continued)

OTHER PUBLICATIONS

"Norton Zone", http://en.wikipedia.org/wiki/Norton_Zone, as accessed Jul. 2 2014, Wikipedia, (on or before Jul. 23, 2014).

(Continued)

*Primary Examiner* — Michael R Vaughan
(74) *Attorney, Agent, or Firm* — FisherBroyles, LLC

(57) ABSTRACT

The disclosed computer-implemented method for securely accessing encrypted data stores may include (1) receiving, from a data storage service, a request to permit authenticated access to an encrypted data store administered by the data storage service, the request including a cryptographic element associated with the encrypted data store that has been encrypted using a public key associated with the authentication device, (2) decrypting the cryptographic element associated with the encrypted data store using a private key associated with the authentication device, (3) encrypting the cryptographic element associated with the encrypted data store using a public key associated with a cryptographic client, and (4) transmitting the encrypted cryptographic element to the cryptographic client to enable the cryptographic client to perform cryptographic operations on the encrypted data store. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2005/0172127 | A1* | 8/2005 | Hartung | H04L 12/5835 713/167 |
| 2007/0124583 | A1* | 5/2007 | Andersson | G06F 21/10 713/165 |
| 2010/0212022 | A1* | 8/2010 | Greevenbosch | G06F 21/10 726/27 |
| 2012/0185693 | A1* | 7/2012 | Chen | H04N 21/41407 713/168 |
| 2015/0347738 | A1* | 12/2015 | Ulrich | G06F 21/35 726/17 |
| 2015/0365385 | A1* | 12/2015 | Hore | H04L 63/0478 713/152 |
| 2016/0078245 | A1* | 3/2016 | Amarendran | G06F 21/6218 713/193 |

OTHER PUBLICATIONS

"Norton Identity Safe", https://identitysafe.norton.com/, as accessed Jul. 23, 2014, Symantec Corporation, (1995).

"Symantec Endpoint Encryption", http://www.symantec.com/endpoint-encryption/, as accessed Jul. 23, 2014, Symantec Corporation, (1995).

Ilya Sokolov, et al.; Systems and Methods for Managing Encryption Keys for Single-sign-on Applications; U.S. Appl. No. 15/083,032, filed Mar. 28, 2016.

"KeyNexus", https://keynexus.net/product/how-it-works/, as accessed Mar. 2, 2016, (Jul. 7, 2014).

Campagna, Matthew, "AWS Key Management Service Cryptographic Details", https://d0.awsstatic.com/whitepapers/KMS-Cryptographic-Details.pdf, as accessed Mar. 2016, Amazon Web Services, (May 2015).

Bradley, John, "Bringing Single Sign-On to Mobile Applications", https://www.pingidentity.com/en/blog/2015/07/01/bringing_single_sign-on_to_mobile_applications.html, as accessed Mar. 2, 2016, (Jul. 1, 2015).

Bradley, John, "Bringing Single Sign on to Mobile Applications", https://www.cloudidentitysummit.com/bringing-single-sign-on-to-mobile-applications/, (presentation at https://www.youtube.com/watch?v=T0DRLYBXuHE, as accessed Mar. 2, 2016), Cloud Identity Summit (CIS) 2015, (Jun. 9, 2015).

"FIPS PUB 140-2", http://csrc.nist.gov/groups/STM/cmvp/standards.html, as accessed Mar. 2, 2016, Standards, FIPS PUB 140-2—Effective Nov. 15, 2001, Security Requirements for Cryptographic Modules, (Nov. 4, 2007).

"Keystore", https://en.wikipedia.org/wiki/Keystore, as accessed Mar. 2, 2016, Wikipedia, (Jul. 10, 2011).

"Hardware security module", https://en.wikipedia.org/wiki/Hardware_security_module, as accessed Mar. 2, 2016, Wikipedia, (Sep. 13, 2006).

"Dropbox", https://www.dropbox.com/, as accessed Mar. 2, 2016, (Dec. 26, 1996).

"LastPass", https://lastpass.com/, as accessed Mar. 2, 2016, (Apr. 14, 2003).

Mahemoff, Michael, "Client-Side Storage", http://www.html5rocks.com/en/tutorials/offline/storage/, as accessed Mar. 2, 2016, (Oct. 1, 2010).

"Amazon", https://www.amazon.com/, as accessed Mar. 2, 2016, (Dec. 12, 1998).

"What is KeyNexus?", https://keynexus.net/, as accessed Mar. 2, 2016, (Oct. 18, 2013).

* cited by examiner

SYSTEMS AND METHODS FOR SECURELY ACCESSING ENCRYPTED DATA STORES

BACKGROUND

Increasingly, individuals and organizations are using cloud-based systems for data storage, even for sensitive data. For the most part, cloud data storage systems are operated by large corporations with good reputations that rely on best practices to ensure the security of their clients' data. Unfortunately, as demonstrated by some widely reported leaks of sensitive data stored in cloud services, even the best practices may not adequately protect sensitive data.

Data stored in cloud services is often vulnerable at a number of points. Access to the user's cloud service account may be accessible to anyone who can obtain or guess the username and password for the account. Data may be transmitted unencrypted or with only weak encryption in either direction between the user and cloud service. System administrators or data backup services employed by the cloud service may be able to access and transmit user data to unauthorized recipients. And, while the cloud service may store user data in encrypted form, the cryptographic key needed to decrypt the data may be still accessible to system administrators of the cloud service.

Since most security practices used by cloud services typically remain confidential, users may have only the reputation of the cloud service to assure them that proper security measures have been implemented. Some large organizations try to ensure that their sensitive data is being adequately protected by operating their own cloud storage service. Even so, these organizations still rely on the competence and integrity of the system administrators they employ to ensure that data security policies are properly implemented.

Finally, even when the user protects their account with a strong password that is kept inaccessible to others, their data is securely encrypted as it is transmitted to and from the cloud service, and the cloud service has implemented best data security practices, the cloud service may still be obligated to release sensitive data when legally required by government. Accordingly, the instant disclosure identifies and addresses a need for additional and improved systems and methods for securely accessing encrypted data stores.

SUMMARY

As will be described in greater detail below, the instant disclosure describes various systems and methods for securely accessing encrypted data stores. In one example, a computer-implemented method for performing such a task may include (1) receiving, from a data storage service, a request to permit authenticated access to an encrypted data store administered by the data storage service, the request including a cryptographic element associated with the encrypted data store that has been encrypted using a public key associated with the authentication device, (2) decrypting the cryptographic element associated with the encrypted data store using a private key associated with the authentication device, (3) encrypting the cryptographic element associated with the encrypted data store using a public key associated with a cryptographic client, and (4) transmitting the encrypted cryptographic element to the cryptographic client to enable the cryptographic client to perform cryptographic operations on the encrypted data store.

In some examples, the computer-implemented method may further include obtaining authorization from a user of the authentication device to permit authenticated access to the encrypted data store. In addition, the computer-implemented method may further include initiating the encrypted data store by (1) generating the cryptographic element, (2) encrypting the cryptographic element with the public key associated with the authentication device, and (3) providing the encrypted cryptographic element to the data storage service. In one example, the computer-implemented method may further include authenticating the request to permit authenticated access to the encrypted data store by comparing the decrypted cryptographic element associated with the encrypted data store with a copy of the cryptographic element stored on the authentication device.

In one embodiment, the cryptographic client may include (1) the data storage service, (2) an additional data storage service, and/or (3) a computing device. In addition, the cryptographic operations may include (1) decrypting the encrypted cryptographic element using a private key associated with the cryptographic client, (2) receiving encrypted data from the encrypted data store, and/or (3) where the cryptographic element represents a cryptographic key, decrypting the encrypted data using the cryptographic element. In some examples, an authentication service may (1) receive the request to permit authenticated access to the encrypted data store, (2) transmit the request to the authentication device, (3) receive the encrypted cryptographic element from the authentication device, and (4) transmit the encrypted cryptographic element to the cryptographic client.

In one embodiment, the data storage service transmits the request to permit authenticated access to the encrypted data store in response to receiving a request to access the encrypted data store from the cryptographic client. In addition, the request to access the encrypted data store may include (1) a user name, (2) a password, (3) information identifying a computing device transmitting the request to access the encrypted data store, (4) a response to a challenge question, (5) biometric information, and/or (6) information from an authentication token.

In one embodiment, a system for implementing the above-described method may include several modules stored in memory, such as (1) a receiving module that receives, from a data storage service, a request to permit authenticated access to an encrypted data store administered by the data storage service, the request including a cryptographic element associated with the encrypted data store that has been encrypted using a public key associated with the authentication device, (2) a cryptography module that both decrypts the cryptographic element associated with the encrypted data store using a private key associated with the authentication device and encrypts the cryptographic element associated with the encrypted data store using a public key associated with a cryptographic client, and/or (3) a transmission module that transmits the encrypted cryptographic element to the cryptographic client to enable the cryptographic client to perform cryptographic operations on the encrypted data store. The system may also include at least one physical processor configured to execute the receiving module, the cryptography module, and the transmission module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, from a data storage service, a request to permit authenticated access to an encrypted data store administered by the data storage service, the request including a cryptographic element associated with the encrypted data store that has been encrypted using a public key associated with the authentication device, (2) decrypt the cryptographic element associated with the encrypted data store using a private key associated with the authentication device, (3) encrypt the cryptographic element associated with the encrypted data store using a public key associated with a cryptographic client, and (4) transmit the encrypted cryptographic element to the cryptographic client to enable the cryptographic client to perform cryptographic operations on the encrypted data store.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
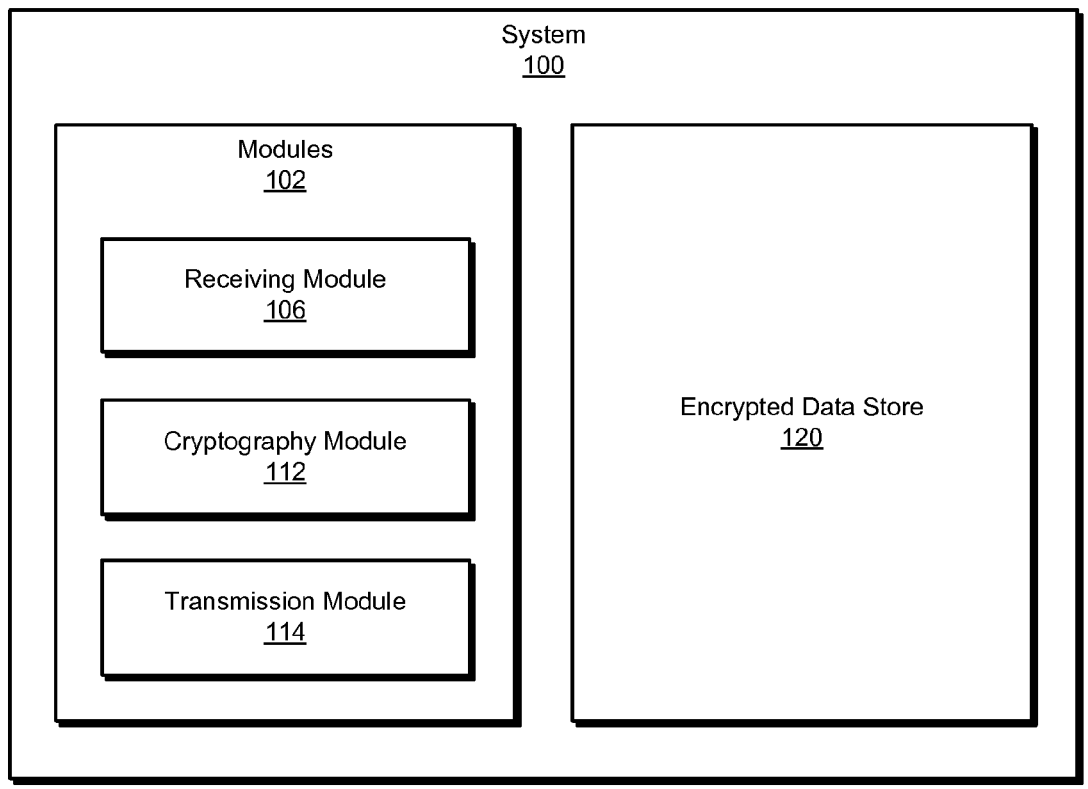
FIG. 1 is a block diagram of an exemplary system for securely accessing encrypted data stores.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be explained in greater detail below, the instant disclosure describes various systems and methods for securely accessing encrypted data stores. In one example, a client-side authentication device may use a cryptographic element as a key to decrypt data from an encrypted data store. Alternatively, the cryptographic element may itself be confidential data that a user desires to protect. The systems and methods described herein may then manage the cryptographic element to protect the encrypted data against password attacks, network eavesdropping, faulty security procedures by cloud services, or disclosure to governments. The systems and methods described herein may also notify a user when an attempt is made to access protected data and obtain authorization to access the same.

Figure 2:
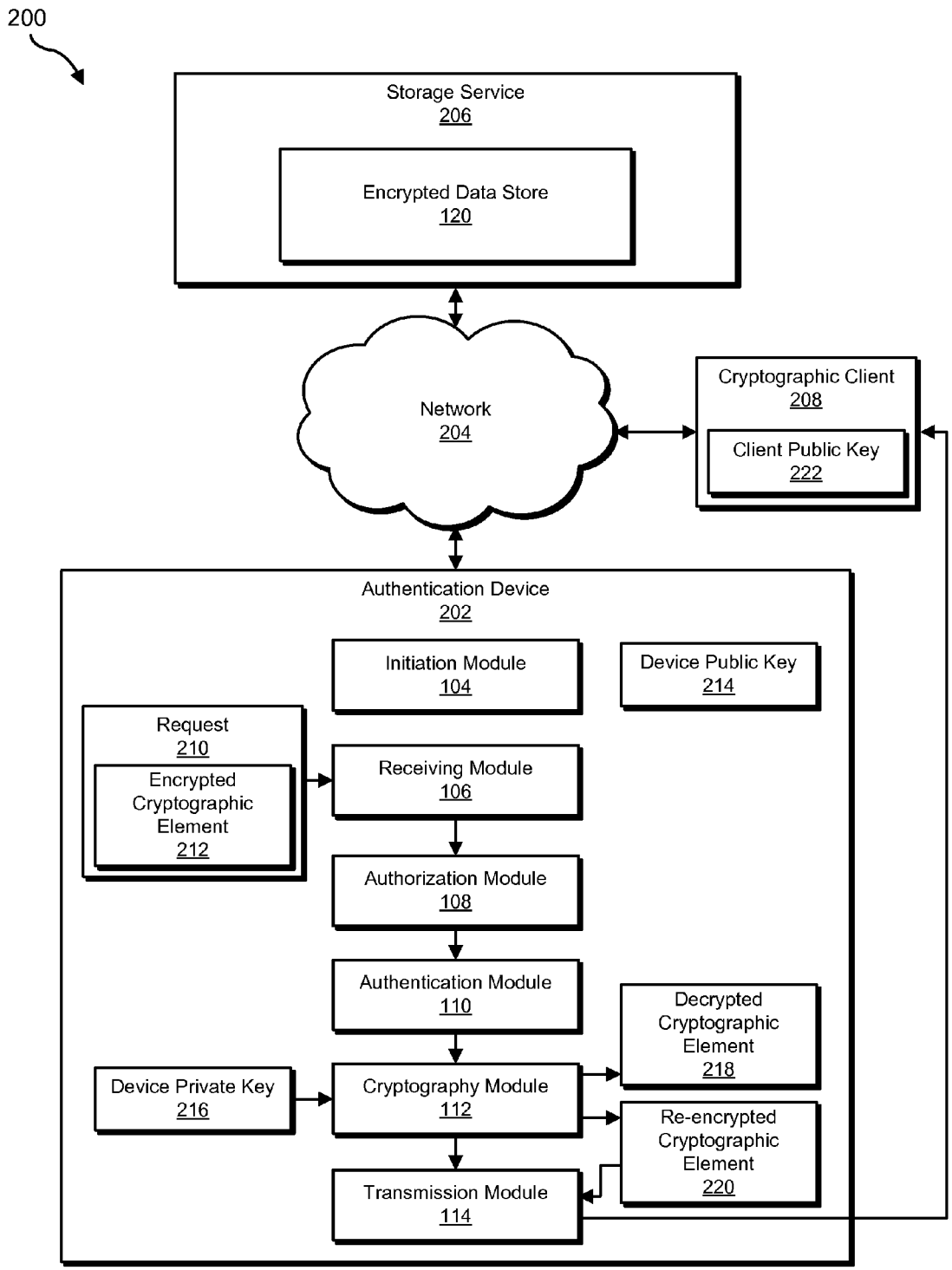
FIG. 2 is a block diagram of an additional exemplary system for securely accessing encrypted data stores.
Figure 3:
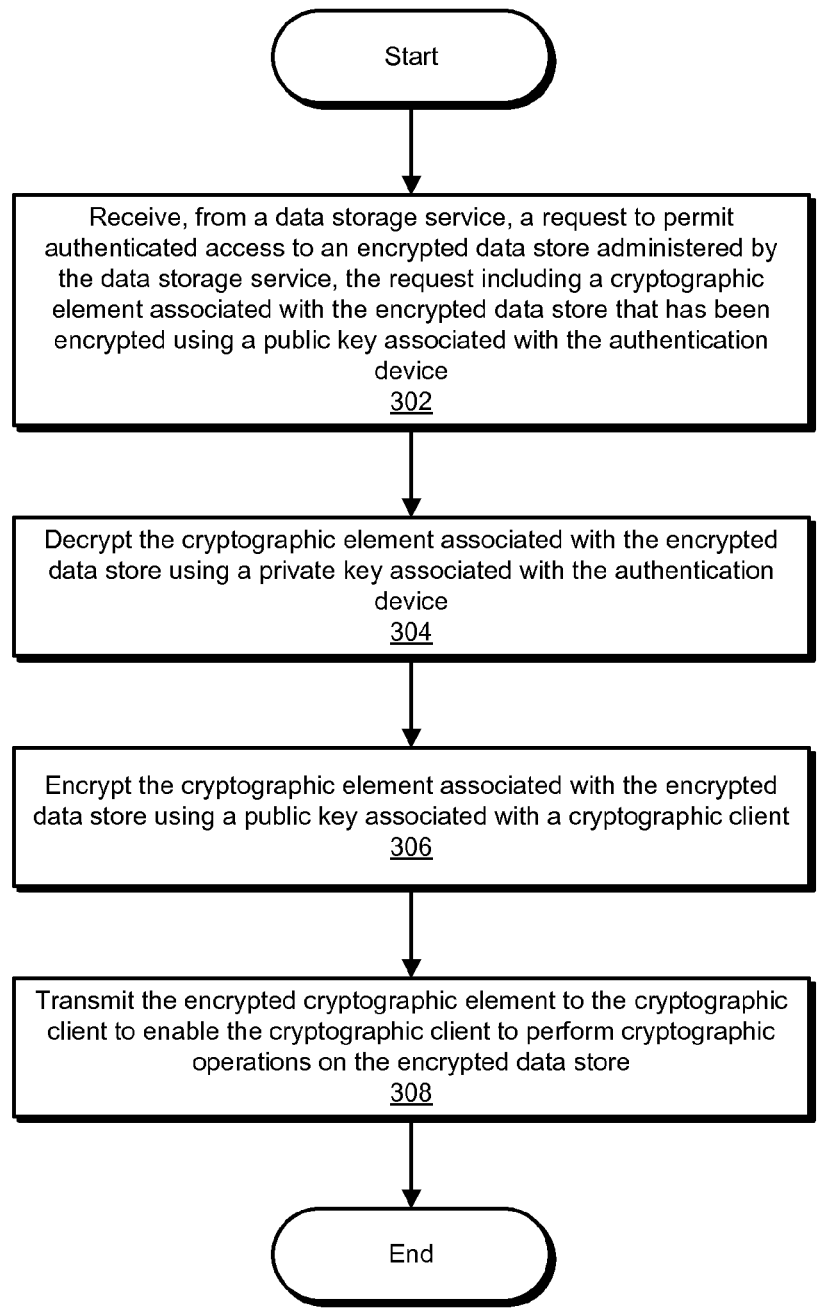
FIG. 3 is a flow diagram of an exemplary method for securely accessing encrypted data stores.
Figure 4:
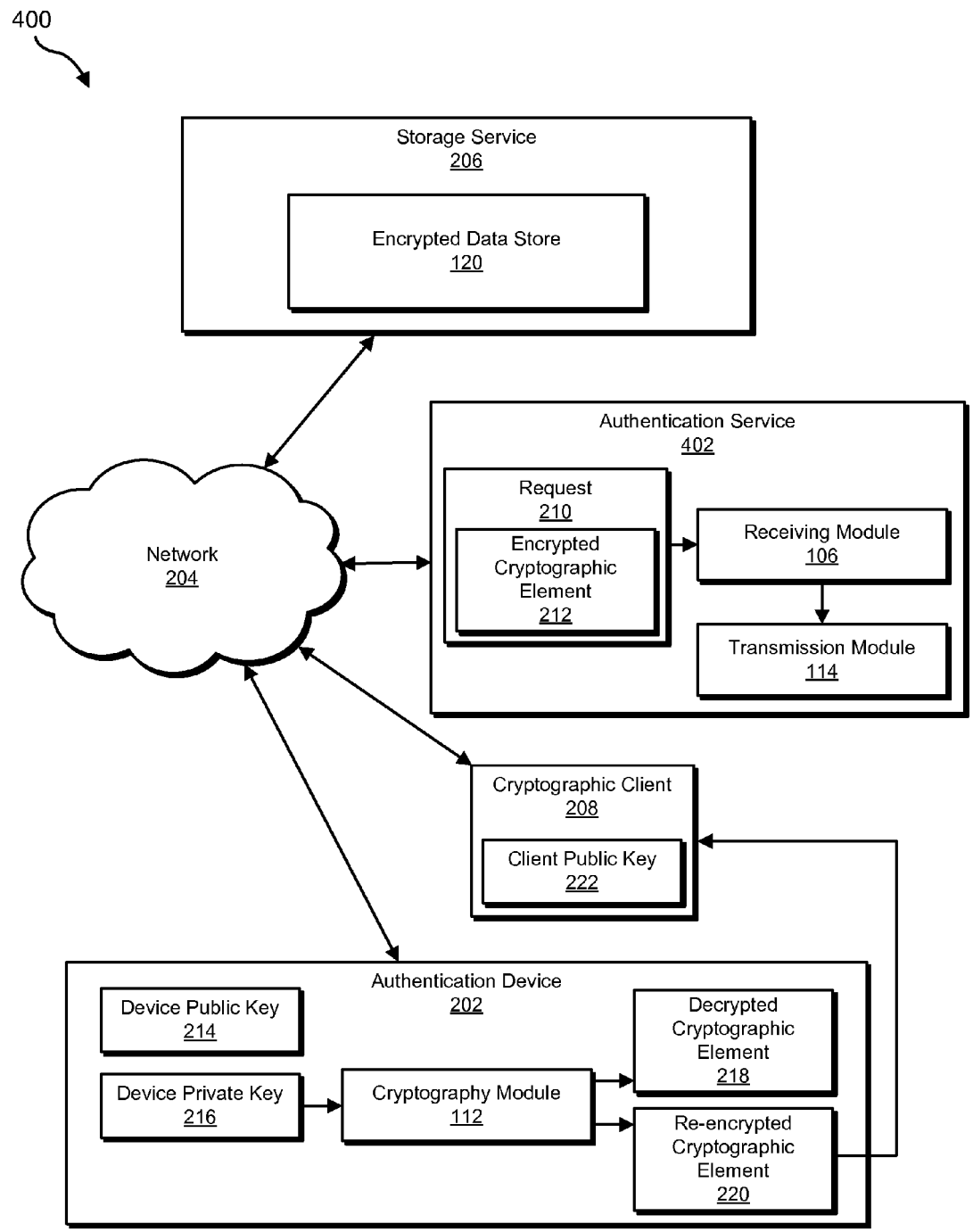
FIG. 4 is a block diagram of an exemplary computing system that includes an authentication service.

The following will provide, with reference to FIGS. 1, 2, and 4, detailed descriptions of exemplary systems for securely accessing encrypted data stores. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for securely accessing encrypted data stores. As illustrated in this figure, exemplary system 100 may include one or more modules 102 for performing one or more tasks. For example, and as will be explained in greater detail below, exemplary system 100 may include a receiving module 106 that may receive, from a data storage service, a request to permit authenticated access to an encrypted data store administered by the data storage service, the request including a cryptographic element associated with the encrypted data store that has been encrypted using a public key associated with the authentication device. Exemplary system 100 may additionally include a cryptography module 112 that may (1) decrypt the cryptographic element associated with the encrypted data store using a private key associated with the authentication device and (2) encrypt the cryptographic element associated with the encrypted data store using a public key associated with a cryptographic client. Exemplary system 100 may additionally include a transmission module 114 that may transmit the encrypted cryptographic element to a cryptographic client to enable the cryptographic client to perform cryptographic operations on the encrypted data store. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., authentication device 202 and/or storage service 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as encrypted data store 120. In one example, encrypted data store 120 may be configured to store personal data belonging to a user or organization in encrypted form. Encrypted data store 120 may represent portions of a single database or computing device, or multiple databases and/or computing devices. For example, encrypted data store 120 may represent a portion of storage service 206 in FIG. 2, computing system 510 in FIG. 5, and/or portions of exemplary network architecture 600 in FIG. 6. Alternatively, encrypted data store 120 in FIG. 1 may represent one or more physically separate devices capable of being accessed by a computing device, such as storage service 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include an authentication device 202 in communication with a storage service 206 via a network 204. In one example, authentication device 202 may be programmed with one or more of modules 102 and/or may store all or a portion of the data in encrypted data store 120. Additionally or alternatively, storage service 206 may be programmed with one or more of modules 102 and/or may store all or a portion of the data in encrypted data store 120.

In one embodiment, one or more of modules 102 from FIG. 1 may, when executed by at least one processor of authentication device 202 and/or storage service 206, enable authentication device 202 and/or storage service 206 to provide secure access to an encrypted data store. In some examples, and as will be described in greater detail below, initiation module 104 may provide an encrypted cryptographic element 212 to storage service 206 during a sign-up procedure. Receiving module 106 may then receive, from data storage service 206, a request 210 to permit authenticated access to an encrypted data store 120 administered by data storage service 206. In this example, request 210 may include an encrypted cryptographic element 212 that has been encrypted using a device public key 214 associated with authentication device 202. Authorization module 108 may query a user of authentication device 202 to obtain authorization to permit authenticated access to encrypted data store 120.

Cryptography module 112 may then (1) decrypt encrypted cryptographic element 212 using device private key 216 associated with authentication device 202 and (2) re-encrypt cryptographic element 212 using a client public key 222 associated with cryptographic client 208. Transmission module 114 may then transmit re-encrypted cryptographic element 220 to cryptographic client 208 to enable cryptographic client 208 to perform cryptographic operations on encrypted data store 120. In one embodiment, authentication module 110 may compare decrypted cryptographic element 218 with a copy of the cryptographic element stored on authentication device 202 to verify that request 210 to authorize access to encrypted data store 120 originated from storage service 206.

Authentication device 202 generally represents any type or form of computing device capable of reading computer-executable instructions. Examples of authentication device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Storage service 206 generally represents any type or form of computing device that is capable of storing, comparing, and/or providing data. Examples of storage service 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between authentication device 202 and storage service 206.

FIG. 3 is a flow diagram of an exemplary computer-implemented method 300 for securely accessing encrypted data stores. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive, from a data storage service, a request to permit authenticated access to an encrypted data store administered by the data storage service. For example, receiving module 106 may, as part of authentication device 202 in FIG. 2, receive, from data storage service 206, a request 210 to permit authenticated access to encrypted data store 120 administered by data storage service 206. In this example, request 210 may include a cryptographic element 212 that has been encrypted using a device public key 214 associated with authentication device 202.

The term "cryptographic element," as used herein, generally refers to any value or object capable of being protected or secured from unauthorized access via one or more cryptographic functions. For example, the phrase "cryptographic element" may refer to a cryptographic key used for encryption and/or authentication. In other examples, the cryptographic element may itself be confidential data that has been encrypted.

In some examples, a cryptographic element may be part of an asymmetric key pair that includes both an encryption key (or "public key") and a decryption key (or "private key"). The encryption key may include any key that does not require secrecy in order to secure data encrypted with the key. For example, the encryption key may be used to encrypt data using an asymmetric key algorithm. Consequently, decrypting data encrypted with the encryption key may require the corresponding decryption key of the asymmetric key pair. In other examples, the same cryptographic element may be used for both encryption and decryption.

The term "encrypted data store," as used herein, generally refers to data stored by a data storage service in encrypted form on behalf of a user or group of users. In some examples, encrypted data is transmitted to the data storage service after being encrypted by the data owner using a cryptographic element that may or may not be part of an asymmetric key pair. In other examples, the encrypted data store may store one or more cryptographic elements in encrypted form. In one embodiment, the data may be provided to a data storage service in unencrypted form. The data storage service may then encrypt the data using a public key in an asymmetric key pair. The data may subsequently be provided to the data owner in encrypted form and decrypted using the private key in the key pair.

The request to permit access to the encrypted data store may take a variety of forms. For example, the data storage service may transmit a request to permit access to the encrypted data store via the Internet, using a standard format, such as extensible markup language (XML) and a secure sockets layer (SSL) connection. In this example, the request may include a cryptographic element associated with the encrypted data store that has been encrypted using a public key associated with the authentication device. In one example, the cryptographic element associated with the encrypted data store may be a key used to encrypt the data in the encrypted data store and which may also be used to decrypt the data. In another example, the cryptographic element may be confidential data that the data storage service is providing in encrypted form.

In another example, the cryptographic element may be an identifier, associated with the authentication device, used to authenticate the request from the data storage service. In this example, the authentication device may decrypt the encrypted cryptographic element using a private key associated with the authentication device and then compare the decrypted value with the identifier stored on the authentication device. For example, the cryptographic element may be a password, data associated with a security token, personally identifiable information (PII) associated with the user, or any data that the user wants to remain confidential.

In some examples, the systems described herein may initiate the encrypted data store by (1) generating the cryptographic element, (2) encrypting the cryptographic element with the public key associated with the authentication device, and (3) providing the encrypted cryptographic element to the data storage service. For example, during a sign-up procedure, initiation module 104 may obtain the cryptographic element from a certificate authority or use an existing cryptographic element on the authentication device. Initiation module 104 may encrypt the cryptographic element using device public key 214 associated with authentication device 202. Transmission module 114 may then provide the encrypted cryptographic element to storage service 206. Storage service 206 may then store the encrypted cryptographic element until the user or another entity acting on behalf of the user requests access to encrypted data store 120. As will be described in greater detail below, an authentication service may also perform some or all of the operations involved in providing an encrypted cryptographic element to storage service 206.

In some examples, the systems described herein may obtain authorization from a user of the authentication device to permit authenticated access to the encrypted data store. For example, after receiving module 106 receives request 210 to permit access to encrypted data store 120, authorization module 108 may query the user of authentication device 202 to obtain authorization to permit authenticated access to encrypted data store 120. By querying the user for permission to allow access to encrypted data store 120, authorization module 108 may determine whether the user or another authorized party initiated the attempt to access encrypted data store 120, or if the access attempt originated from malware or a hacker. In some examples, authorization module 108 may query the user by displaying a message on a display on authentication device 202. In other examples, authorization module 108 may direct the query to a display attached to another computing device.

At step 304, one or more of the systems described herein may decrypt the cryptographic element associated with the encrypted data store using a private key associated with the authentication device. For example, cryptography module 112 may, as part of authentication device 202 in FIG. 2, decrypt cryptographic element 212 using device private key 216 associated with authentication device 202 to obtain decrypted cryptographic element 218.

Cryptography module 112 may manage cryptographic elements and key pairs in a variety of ways. For example, cryptography module 112 may maintain separate pairs of public and private keys for each of several storage services. Doing so may provide a higher level of security, since obtaining a private key for one storage service would not enable decryption of data in other storage services. Maintaining separate pairs of encryption/decryption keys may also permit the authentication device to interact with different storage services in different ways. For example, the authentication device may permit a trusted storage service to store a private key associated with the user's data stored by that storage service (to enable back-end processing of the data, for example). The authentication device may then provide a private key associated with another storage service only in encrypted form, or keep the private key only on the authentication device and not provide it to the storage service at all. As will be described in greater detail below, some key management operations may be performed on behalf of the authentication device by an authentication service.

In some examples, the systems described herein may authenticate the request to permit authenticated access to the encrypted data store by comparing the decrypted cryptographic element associated with the encrypted data store with a copy of the cryptographic element stored on the authentication device. For example, after decrypting encrypted cryptographic element 212 to obtain decrypted cryptographic element 218, authentication module 110 may compare decrypted cryptographic element 218 to a copy of the cryptographic element stored on authentication device 202. The cryptographic element may be the key used to encrypt data in encrypted data store 120 or it may be an identifier, associated with authentication device 202, that is used to verify that request 210 to authorize access to encrypted data store 120 actually originated from storage service 206.

At step 306, one or more of the systems described herein may encrypt the cryptographic element associated with the encrypted data store using a public key associated with a cryptographic client. For example, cryptography module 112 may, as part of authentication device 202 in FIG. 2, encrypt cryptographic element 212 using client public key 222 associated with cryptographic client 208.

Cryptography module 112 may provide the cryptographic element associated with the encrypted data store to a cryptographic client in a variety of ways. In one embodiment, the data storage service may transmit the request to permit authenticated access to the encrypted data store in response to receiving a request to access the encrypted data store from the cryptographic client. Examples of the cryptographic client may include (1) the data storage service, (2) an additional data storage service, and/or (3) a computing device. In one example, the authentication device may request a digital certificate from the cryptographic client to authenticate the identity of the cryptographic client. In this example, the certificate may include a public encryption key issued by a certificate authority that the authentication device may then use to encrypt the cryptographic element for transmission to the cryptographic client.

At step 308, one or more of the systems described herein may transmit the encrypted cryptographic element to the cryptographic client to enable the cryptographic client to perform cryptographic operations on the encrypted data store. For example, transmission module 114 may, as part of authentication device 202 in FIG. 2, transmit re-encrypted cryptographic element 220 to cryptographic client 208 to enable cryptographic client 208 to perform cryptographic operations on data in encrypted data store 120.

Transmission module 114 may transmit the cryptographic element to the cryptographic client in a variety of ways and for a variety of purposes. In one embodiment, the cryptographic operations may include (1) decrypting the encrypted cryptographic element using a private key associated with the cryptographic client, (2) receiving encrypted data from the encrypted data store, and (3) decrypting the encrypted data using the cryptographic element. For example, the request to permit access to the encrypted data store may include a request from the data storage service for the cryptographic element encrypted with a public key associated with the storage service. In this example, the storage service may use the obtained cryptographic element to decrypt the data and provide it to a server performing back-end processing operations. In another example, a second data storage service may request an encrypted copy of the cryptographic element as part of a data-migration operation. In this example, the second data storage service may receive encrypted data from the first data storage service, decrypt the data, then re-encrypt the data using a public key that the authentication device associates with the second data storage service. In both of the examples given above (and in contrast to the example given below), providing the cryptographic element to the storage services involved implies a degree of trust in the data storage services on the part of the data owner.

In another example, the cryptographic client may be a computing device operated by a user or authorized by the user to access the encrypted data. For example, the user, working at a computer, may wish to access data in the encrypted data store. In this example, the user may request that the data storage service permit access to the encrypted data store. The data storage service may then send a request to the authentication device to authorize access to the encrypted data store. The authentication device may then request authorization from the user, either by displaying a request on a display on the authentication device or on the computing device in use by the user. After the user authorizes access to the encrypted data store, the authentication device may transmit authorization to the storage service and transmit the cryptographic element (encrypted with a public key associated with the computing device) to the computing device. The storage service may then transmit encrypted data to the computing device for decryption and completion of the functions intended when the user initiated access to the data.

In another example, the cryptographic element itself may represent confidential data that is stored by the data storage service in encrypted form. In this example, the cryptographic client may request the cryptographic element from the data storage service. The cryptographic element may be one of several items of confidential data that the data storage service stores in encrypted form on behalf of the user. After receiving the request for the cryptographic element, the data storage service may then transmit the encrypted cryptographic element to the authentication device. The authentication device may then decrypt the cryptographic element using a private key stored on the authentication device, re-encrypt the cryptographic element using a public key associated with the cryptographic client, then transmit the re-encrypted cryptographic element to the cryptographic client. In this example, rather than decrypting the cryptographic element to use it as a key to decrypt data in the encrypted data store, the cryptographic element itself is the data the cryptographic client requested from the data storage service. The cryptographic client may then decrypt the cryptographic element and apply the decrypted data to the purpose for which it was requested.

In some examples, the user may be required to provide a user name and password or other credentials to log into the data storage service before requesting access to the encrypted data store. In one embodiment, the request to access the encrypted data store may include (1) a user name, (2) a password, (3) information identifying a computing device transmitting the request to access the encrypted data store, (4) a response to a challenge question, (5) biometric information, and/or (6) information from an authentication token.

In one embodiment, an authentication service may (1) receive the request to permit authenticated access to the encrypted data store, (2) transmit the request to the authentication device, (3) receive the encrypted cryptographic element from the authentication device, and (4) transmit the encrypted cryptographic element to the cryptographic client. FIG. 4 is a block diagram of an exemplary computing system 400 that includes an authentication service. Exemplary computing system 400 may include previously described modules included in exemplary system 100 and components of exemplary computing system 200. Additionally, exemplary computing system 400 may include an authentication service 402 that acts as an intermediary service between storage service 206 and authentication device 202. In this example, authentication service 402 may receive request 210 from storage service 206 to permit access to encrypted data store 120. Authentication service 402 may then notify authentication device 202 of request 210 to access encrypted data store 120 and transmit the encrypted cryptographic element 212 that was included in request 210. The use of authentication service 402 may prove particularly advantageous when the authentication device interacts with more than one storage service and each storage service interacts with many authentication devices. In this case, the authentication service becomes a single point of contact through which communications between storage service and authentication devices may be routed. In some embodiments, authentication service 402 may also authenticate cryptographic clients and/or provide storage and management services for public keys.

As described above, the systems and methods described herein may secure encrypted data stores. In one example, these systems may use a cryptographic element as a cryptographic key for decrypting an encrypted data store on an authentication device. Alternatively, the cryptographic element may represent confidential data stored in encrypted form. These systems and methods may then manage the cryptographic element in order to protect the encrypted data store against password attacks, network eavesdropping, faulty security procedures by cloud services, or disclosure to governments. Some embodiments described herein may enable the owner of the encrypted data store to obtain access to the data without a storage service ever possessing the data or the cryptographic element in unencrypted form or without transmitting data over a network in unencrypted form. Since the storage service may not have access to unencrypted data or cryptographic elements, the storage service may not be capable of releasing unencrypted data, whether accidentally, maliciously, or in response to legal requirements. Additionally, the systems and methods described herein may notify the user when an attempt is made to access protected data and obtain authorization to access same.

The systems and methods described herein may also provide a basis for an authentication service that facilitates and manages communications between storage services and authentication devices, thereby simplifying the administrative requirements for both storage services and users of authentication devices. This authentication service may also authenticate cryptographic clients and provide public key management services.

Figure 5:
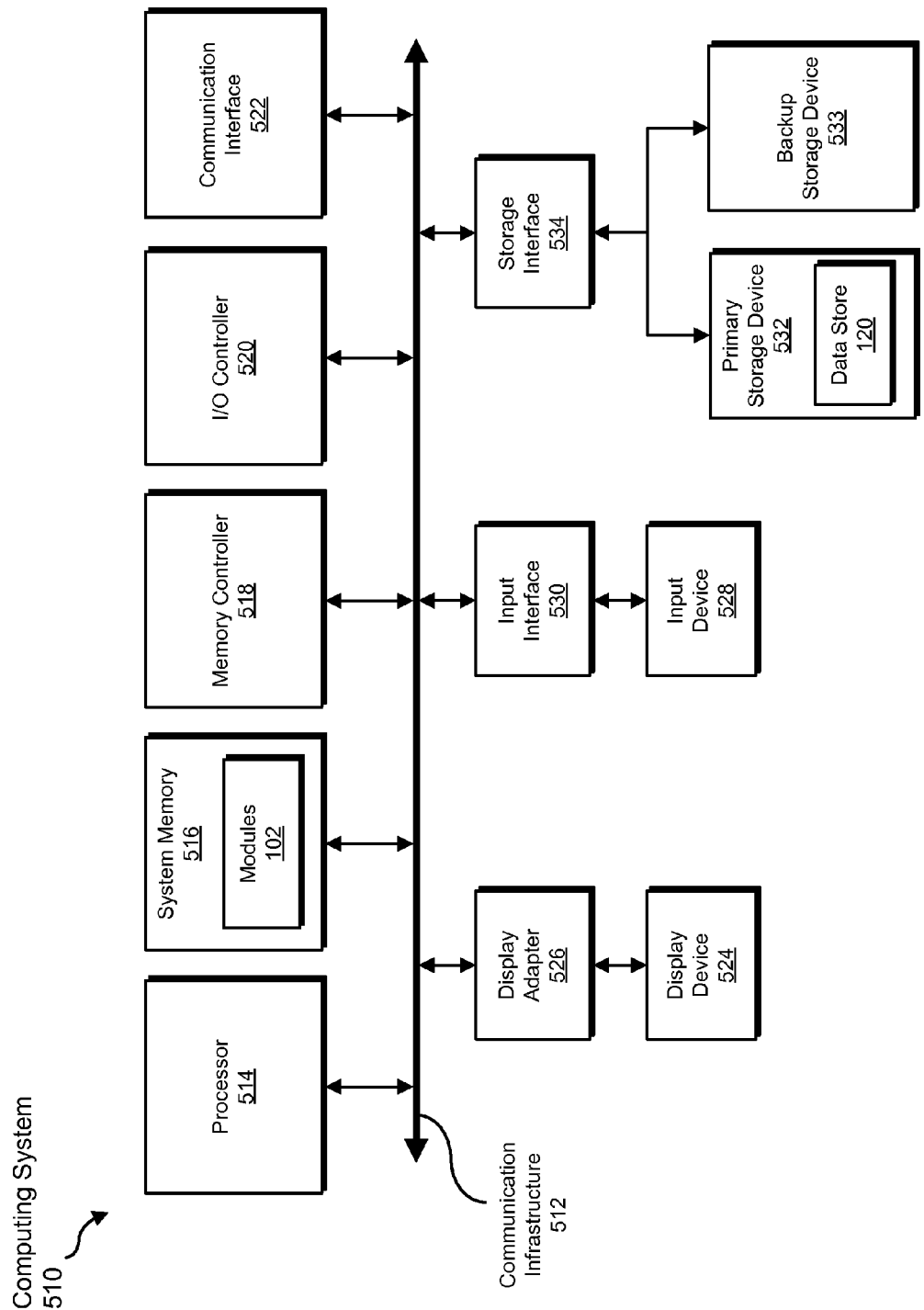
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, encrypted data store 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
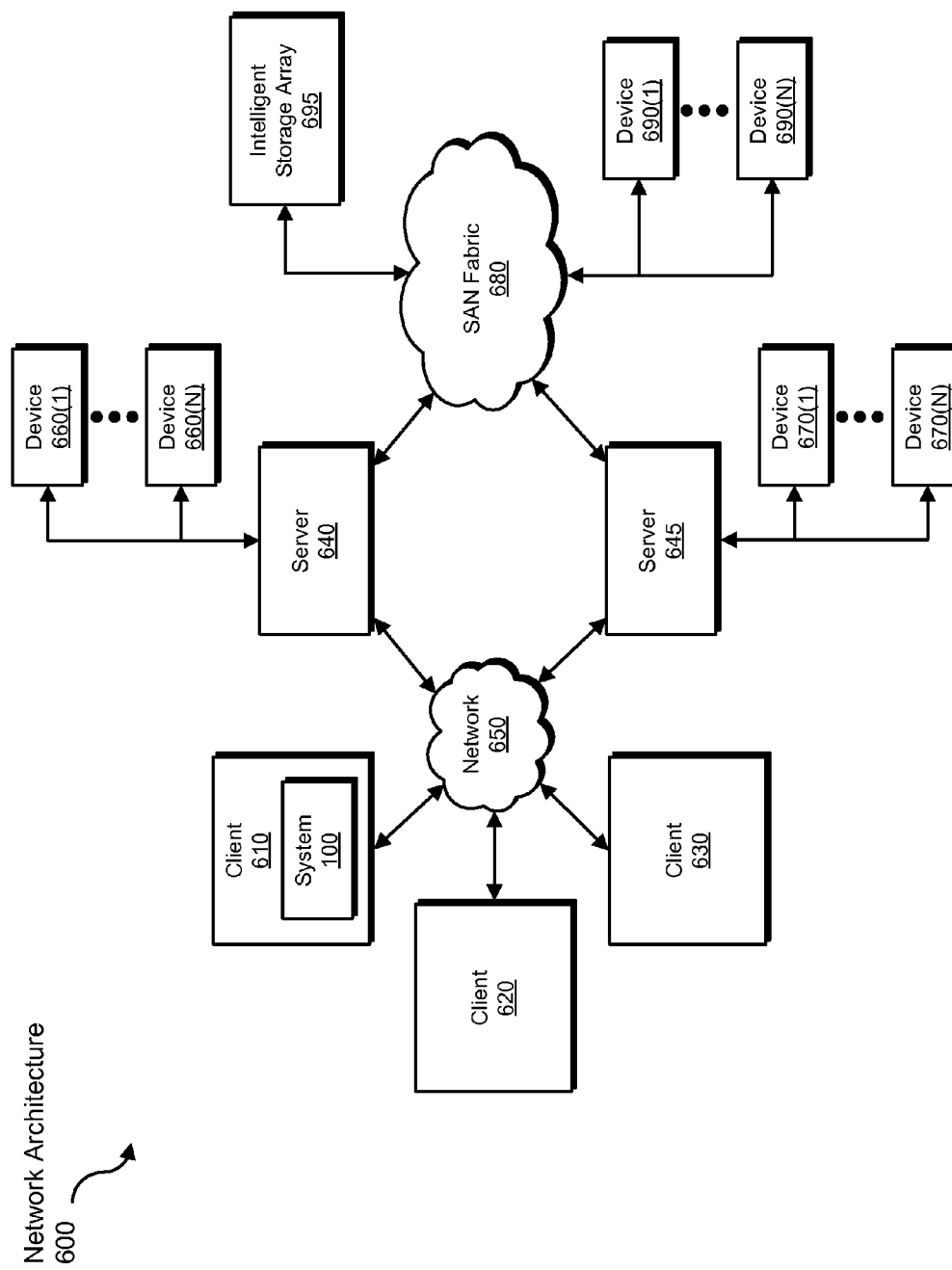
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for securely accessing encrypted data stores.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an encrypted cryptographic element to be transformed, transform the encrypted cryptographic element, and output a result of the transformation as a cryptographic element that may be decrypted by a client and used to decrypt encrypted data. In another example, one or more of the modules recited herein may transform one or more computing devices into a system for securely accessing encrypted data stores. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securely accessing encrypted data stores, at least a portion of the method being performed by an authentication device comprising at least one processor, the method comprising:
   receiving, from a data storage service, a service request to permit authenticated access to an encrypted data store administered by the data storage service, wherein:
      the service request is transmitted in response to receiving a client request to permit authenticated access to the encrypted data store from a cryptographic client;
      the data storage service has not had access to data in the encrypted data store in unencrypted form; and
      the service request includes a cryptographic element associated with the encrypted data store that has been encrypted using a public key associated with the authentication device, wherein the data storage service has not had access to the cryptographic element in unencrypted form;
   decrypting the cryptographic element associated with the encrypted data store using a private key associated with the authentication device;
   encrypting the cryptographic element associated with the encrypted data store using a public key associated with the cryptographic client; and
   transmitting the encrypted cryptographic element to the cryptographic client to enable the cryptographic client to perform cryptographic operations on the encrypted data store.

2. The computer-implemented method of claim 1, further comprising obtaining authorization from a user of the authentication device to permit authenticated access to the encrypted data store.

3. The computer-implemented method of claim 1, further comprising initializing the encrypted data store by:
   generating the cryptographic element;
   encrypting the cryptographic element with the public key associated with the authentication device; and
   providing the encrypted cryptographic element to the data storage service.

4. The computer-implemented method of claim 1, further comprising authenticating the client request to permit authenticated access to the encrypted data store by comparing the decrypted cryptographic element associated with the encrypted data store with a copy of the cryptographic element stored on the authentication device.

5. The computer-implemented method of claim 1, wherein the cryptographic client comprises at least one of:
   the data storage service;
   an additional data storage service; and
   a computing device.

6. The computer-implemented method of claim 1, wherein the cryptographic operations comprise at least one of:
   decrypting the encrypted cryptographic element using a private key associated with the cryptographic client;
   receiving encrypted data from the encrypted data store; and
   decrypting the encrypted data using the cryptographic element.

7. The computer-implemented method of claim 1, wherein an authentication service:
   receives the service request to permit authenticated access to the encrypted data store;
   transmits the service request to the authentication device;
   receives the encrypted cryptographic element from the authentication device; and
   transmits the encrypted cryptographic element to the cryptographic client.

8. The computer-implemented method of claim 1, wherein the data storage service transmits the service request to permit authenticated access to the encrypted data store in response to receiving a client request to access the encrypted data store from the cryptographic client.

9. The computer-implemented method of claim 8, wherein the client request to access the encrypted data store comprises at least one of:
- a user name;
- a password;
- information identifying a computing device transmitting the client request to access the encrypted data store;
- a response to a challenge question;
- biometric information; and
- information from an authentication token.

10. A system for securely accessing encrypted data stores, the system comprising:
- a receiving module, stored in memory, that receives, from a data storage service, a service request to permit authenticated access to an encrypted data store administered by the data storage service, wherein:
  - the service request is transmitted in response to receiving a client request to permit authenticated access to the encrypted data store from a cryptographic client;
  - the data storage service has not had access to data in the encrypted data store in unencrypted form; and
  - the service request includes a cryptographic element associated with the encrypted data store that has been encrypted using a public key associated with an authentication device, wherein the data storage service has not had access to the cryptographic element in unencrypted form;
- a cryptography module, stored in memory, that:
  - decrypts the cryptographic element associated with the encrypted data store using a private key associated with the authentication device; and
  - encrypts the cryptographic element associated with the encrypted data store using a public key associated with the cryptographic client;
- a transmission module, stored in memory, that transmits the encrypted cryptographic element to the cryptographic client to enable the cryptographic client to perform cryptographic operations on the encrypted data store; and
- at least one physical processor configured to execute the receiving module, the cryptography module, and the transmission module.

11. The system of claim 10, further comprising an authorization module, stored in memory, that obtains authorization from a user of the authentication device to permit authenticated access to the encrypted data store.

12. The system of claim 10, further comprising an initialization module, stored in memory, that initializes the encrypted data store by:
- generating the cryptographic element;
- encrypting the cryptographic element with the public key associated with the authentication device; and
- providing the encrypted cryptographic element to the data storage service.

13. The system of claim 10, further comprising an authentication module, stored in memory, that authenticates the client request to permit authenticated access to the encrypted data store by comparing the decrypted cryptographic element associated with the encrypted data store with a copy of the cryptographic element stored on the authentication device.

14. The system of claim 10, wherein the cryptographic client comprises at least one of:
- the data storage service;
- an additional data storage service; and
- a computing device.

15. The system of claim 10, wherein the cryptographic operations comprise at least one of:
- decrypting the encrypted cryptographic element using a private key associated with the cryptographic client;
- receiving encrypted data from the encrypted data store; and
- decrypting the encrypted data using the cryptographic element.

16. The system of claim 10, wherein an authentication service:
- receives the service request to permit authenticated access to the encrypted data store;
- transmits the service request to the authentication device;
- receives the encrypted cryptographic element from the authentication device; and
- transmits the encrypted cryptographic element to the cryptographic client.

17. The system of claim 10, wherein the data storage service transmits the service request to permit authenticated access to the encrypted data store in response to receiving a client request to access the encrypted data store from the cryptographic client.

18. The system of claim 17, wherein the client request to access the encrypted data store comprises at least one of:
- a user name;
- a password;
- information identifying a computing device transmitting the client request to access the encrypted data store;
- a response to a challenge question;
- biometric information; and
- information from an authentication token.

19. A non-transitory computer-readable medium comprising one or more computer-readable instructions that, when executed by at least one processor of an authentication device, cause the authentication device to:
- receive, from a data storage service, a service request to permit authenticated access to an encrypted data store administered by the data storage service, wherein:
  - the service request is transmitted in response to receiving a client request to permit authenticated access to the encrypted data store from a cryptographic client;
  - the data storage service has not had access to data in the encrypted data store in unencrypted form; and
  - the service request includes a cryptographic element associated with the encrypted data store that has been encrypted using a public key associated with the authentication device, wherein the data storage service has not had access to the cryptographic element in unencrypted form;
- decrypt the cryptographic element associated with the encrypted data store using a private key associated with the authentication device;
- encrypt the cryptographic element associated with the encrypted data store using a public key associated with the cryptographic client; and
- transmit the encrypted cryptographic element to the cryptographic client to enable the cryptographic client to perform cryptographic operations on the encrypted data store.

20. The non-transitory computer-readable medium of claim 19, wherein the one or more computer-readable instructions cause the authentication device to obtain authorization from a user of the authentication device to permit authenticated access to the encrypted data store.

* * * * *